US012720032B2

(12) United States Patent
Deng et al.

(10) Patent No.: US 12,720,032 B2
(45) Date of Patent: Aug. 25, 2026

(54) LARGE-VIEWING-ANGLE INTEGRAL IMAGING 3D DISPLAY DEVICE BASED ON SECONDARY LIGHT FIELD MODULATION

(71) Applicant: Sichuan University, Chengdu (CN)

(72) Inventors: Huan Deng, Chengdu (CN); Yu-Ang Chen, Chengdu (CN); Yucheng Bai, Chengdu (CN); Jun Tang, Chengdu (CN); Jie Yang, Chengdu (CN); Chongji Zhao, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 19/169,901

(22) Filed: Apr. 3, 2025

(65) Prior Publication Data

US 2025/0317544 A1 Oct. 9, 2025

(30) Foreign Application Priority Data

Apr. 7, 2024 (CN) ......................... 202410408456.5

(51) Int. Cl.
*H04N 13/211* (2018.01)
*H04N 13/229* (2018.01)
*H04N 23/957* (2023.01)

(52) U.S. Cl.
CPC ......... *H04N 13/211* (2018.05); *H04N 13/229* (2018.05); *H04N 23/957* (2023.01)

(58) Field of Classification Search
CPC .. H04N 13/211; H04N 13/229; H04N 23/957; H04N 13/305; H04N 13/307; H04N 13/351; G02B 30/27; G02B 30/31
USPC ........................................................... 348/51
See application file for complete search history.

(56) References Cited

U.S. PATENT DOCUMENTS

2014/0347361 A1* 11/2014 Alpaslan ................. G06T 15/50 345/426
2023/0176393 A1* 6/2023 Liu .................... G02B 27/0172 359/641
2025/0097403 A1* 3/2025 Kaehler ................. G02B 30/56

OTHER PUBLICATIONS

English Translation of Chinese Publication CN116456069 Jul. 2023 (Year: 2023).*

* cited by examiner

*Primary Examiner* — Loi H Tran
(74) *Attorney, Agent, or Firm* — Pilloff Passino & Cosenza LLP; Rachel Pilloff; Sean Passino

(57) ABSTRACT

Disclosed is a large-viewing-angle integral imaging 3D display device based on secondary light field modulation. The device includes a 2D display screen, a light field guiding layer and a light field reconstruction layer. The 2D display screen is located at a bottom layer of the device, and the light field guiding layer and the light field reconstruction layer are located above sequentially. The 2D display screen displays an interleaved coded elemental image array and provides an interleaved light field for an upper structure of the device. The light field guiding layer performs first light field modulation and is configured to modulate light emitted from the 2D display screen and guide and separate interleaved light field with different viewing area information in space. The light field reconstruction layer performs secondary light field modulation, and is configured to reconstruct and splice separated light beams modulated by the light field guiding layer.

6 Claims, 4 Drawing Sheets

LARGE-VIEWING-ANGLE INTEGRAL IMAGING 3D DISPLAY DEVICE BASED ON SECONDARY LIGHT FIELD MODULATION

CROSS-REFERENCE TO RELATED APPLICATIONS

This application claims priority under 35 U.S.C. § 119(a) to Chinese Patent Application No. 202410408456.5, filed on Apr. 7, 2024, which is hereby incorporated by reference herein in its entirety.

TECHNICAL FIELD

The present disclosure belongs to the technical field of three-dimensional display, and in particular to a large-viewing-angle integral imaging 3D display device based on secondary light field modulation.

BACKGROUND ART

Integral imaging technology is a simple, efficient, high-performance naked-eye 3D display technology. Without need of additional visual aids, integral imaging enables to provide depth information only through precise coupling of a lens array and an image array. The integral imaging technology is deemed as a very promising stereoscopic display technology with great potential of application to many fields such as medicine, military, and education. For the integral imaging technology, a viewing angle is a key indicator. Real information of an object can be restored at a wider viewing angle as much as possible, and many people are allowed to view simultaneously. Unfortunately, the integral imaging technology still has the technical disadvantage of a narrow viewing angle at present. As illustrated in FIG. 1, traditional integral imaging has a periodic structure, which results in a periodic arrangement of primary and secondary viewing areas in a display space, and the same information content is displayed in each viewing area, which not only limits a viewing angle, but also causes waste of the display space.

At present, there are some technical solutions for expanding the viewing angle. Positions of viewers can be acquired through an eye-tracking method, and 3D images of corresponding positions can be updated in real time. However, this method does not allow many people to view simultaneously, but only improves a viewing experience of a single person. A curved display device and the lens array can be used to overcome the defects of the eye-tracking method, but this method imposes significant requirements for manufacturing of display panels and the lens arrays, and the curved 3D display device is prone to image distortion and has the characteristics of poor overall stability and convenience. In time-division multiplexing technology, a photoelectric device with a rapid response function cooperates with the display panel, to equivalently increase a pitch of elemental lens or a size of elemental image so as to expand the viewing angle. However, such methods have the defects related to high refresh rates of photoelectric devices, precise movement of mechanical structures or complex system structures that are difficult to overcome.

SUMMARY

In order to overcome the defects in the prior art, the present disclosure provides a large-viewing-angle integral imaging 3D display device based on secondary light field modulation. The device includes a 2D display screen, a light field guiding layer and a light field reconstruction layer. As illustrated in FIG. 2, the 2D display screen is located at a bottom layer of the device, and the light field guiding layer and the light field reconstruction layer are located above sequentially. The 2D display screen is configured to display an interleaved coded elemental image array and provide interleaved light fields with different visual area information for an upper structure of the device. The light field guiding layer is a micro-lens array and configured to modulate light emitted from the 2D display screen and guide and separate the interleaved light field with different viewing area information in space. The light field reconstruction layer is a large lens array and configured to receive separated light beams modulated by the light field guiding layer, reconstruct the separated light beams from different directions into separated viewing areas respectively, and merge the separated viewing areas simultaneously to achieve expansion of a 3D viewing angle.

The interleaved coded elemental image array is composed of a plurality of interleaved elemental images, and each of the interleaved elemental images is composed of m sub-pixels of the 2D display screen and contains part of the light field information in all the separated viewing areas.

The light field guiding layer is a micro-lens array located above the 2D display screen, and is formed by arranging a plurality of micro-lenses with the same parameters, which performs first light field modulation on the light emitted from the 2D display screen. As illustrated in FIG. 3, each micro-lens modulates n sub-pixels in an interleaved elemental image covered by same, and the light emitted by sub-pixels at different positions in each interleaved elemental image is refracted by the micro-lens to produce separated light beams in n directions.

Preferably, the 2D display screen is located at a focal plane beneath the light field guiding layer to reduce a divergence angle of the separated light beams and avoid crosstalk between adjacent light beams during the secondary light field modulation.

Preferably, the number n of sub-pixels modulated by the micro-lens should be less than 30 to mitigate an impact of edge aberration of the micro-lens on light modulation, and a pitch of the large lens array should not be too large to ensure a 3D display effect.

The light field reconstruction layer is a large lens array located above the light field guiding layer, and is formed by arranging a plurality of large lenses with the same parameters, which performs the secondary light field modulation on the light emitted from the 2D display screen. As illustrated in FIG. 4, the separated light beams in the n directions generated by the light field guiding layer are respectively irradiated to n adjacent large lenses, and at the same time, each large lens is irradiated by $$\frac{m}{n}$$

the separated light beams refracted by n adjacent micro-lenses. It is ensured that a parameter $$\frac{m}{n}$$

is designed to be an integer. Each large lens refracts and converges the separated light beams to form n adjacent separated viewing areas, and the n separated viewing areas can be merged into a complete viewing area by adjusting 3D content of the n separated viewing areas. A visual angle θ of the complete viewing area can be calculated based on the formula (1):

$$\theta = 2\arctan\left(\frac{mnp_d}{2d}\right) \quad (1)$$

where $p_d$ is a sub-pixel width of the 2D display screen, and d is a distance between the light field guiding layer and the light field reconstruction layer.

As illustrated in FIG. 5, in order to ensure that the light field information of different separated viewing areas can be accurately separated and reconstructed, parameters of the sub-pixels, the light field guiding layer and the light field reconstruction layer need to meet the following requirements:

$$\frac{d}{d+f_l} = \frac{np_d}{p_l} \quad (2)$$

$$\frac{Q_L}{d} = \frac{p_d}{f_l} \quad (3)$$

where $f_l$ and $p_l$ are a focal length and pitch of the light field guiding layer, and $Q_L$ is a pitch of the light field reconstruction layer.

Preferably, the 2D display screen, the light field guiding layer and the light field reconstruction layer are center-aligned, such that a width of a single separated light beam is enough to just illuminate one large lens, thereby ensuring that each large lens does not reconstruct the separated light beams irradiating adjacent large lens.

Preferably, the distance d between the light field guiding layer and the light field reconstruction layer is not less than $$\frac{f_l p_l}{p_d},$$

to ensure that the separated light beams irradiating the same large lens can completely overlap:

The present disclosure provides a large-viewing-angle integral imaging 3D display device based on secondary light field modulation, and a method of displaying different content in a plurality of viewing areas and then splicing and recombining is used to expand a viewing angle. The 2D display screen is configured to display the interleaved coded elemental image array and provide the interleaved light field with different viewing area information. The light field guiding layer performs the first light field modulation to guide and separate the light emitted from the sub-pixels in the interleaved elemental images to form a plurality of separated light beams. The light field reconstruction layer performs the secondary light field modulation to reconstruct the separated light beams into separated viewing areas, and then displays continuous 3D information in different separated viewing areas to effectively expand the viewing angle.

REFERENCE NUMERALS IN THE ABOVE FIGURES

1—primary viewing area of traditional integral imaging device, 2—secondary viewing area of traditional integral imaging device, 3—elemental image array of traditional integral imaging device, 4—traditional lens array, 500—2D display screen, 501—2D display screen sub-pixel, 600—light field guiding layer, 601—micro-lens, 7—separated light beam, 800—light field reconstruction layer, 801—large lens, 9—separated viewing area, and 10—complete viewing area.

It should be understood that the above accompanying drawings are only schematic and are not drawn to scale.

DETAILED DESCRIPTION

A typical example of a large-viewing-angle integral imaging 3D display device based on secondary light field modulation is described in detail below, and the present disclosure is further described in detail. It should be noted that the following examples are intended solely for further explanation of the present disclosure and should not be construed as a limitation on the protection scope of the present disclosure. Some non-essential improvements and adjustments made by those skilled in the art according to the content of the present disclosure still fall within the protection scope of the present disclosure.

Figure 1:
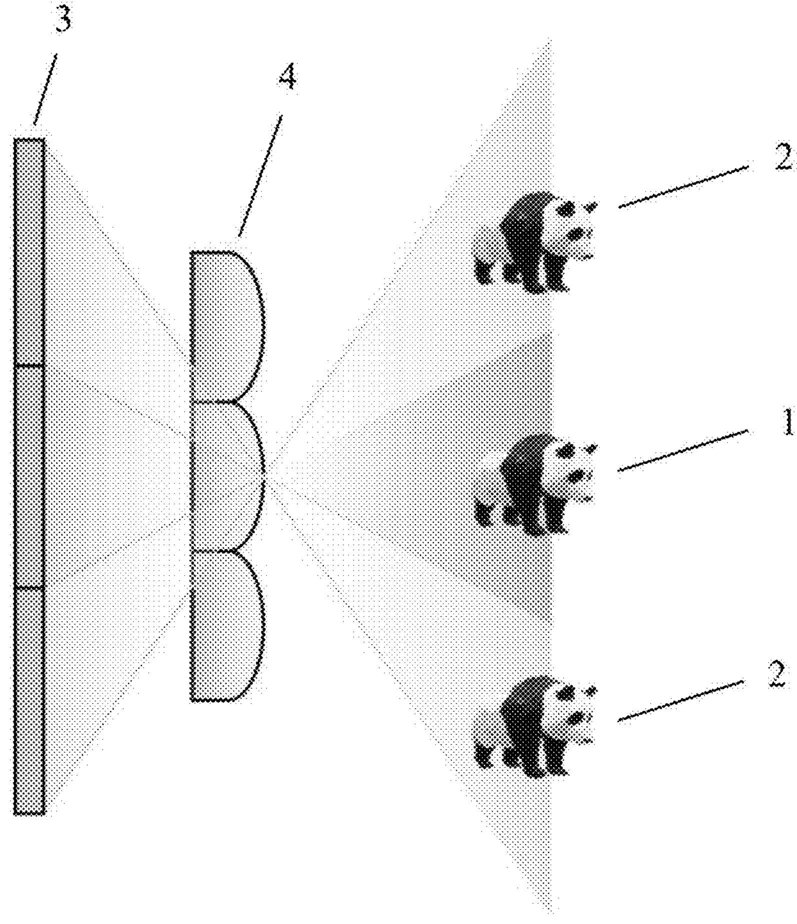
FIG. 1 is a schematic diagram of forming a viewing area of a traditional integral imaging device.
Figure 2:
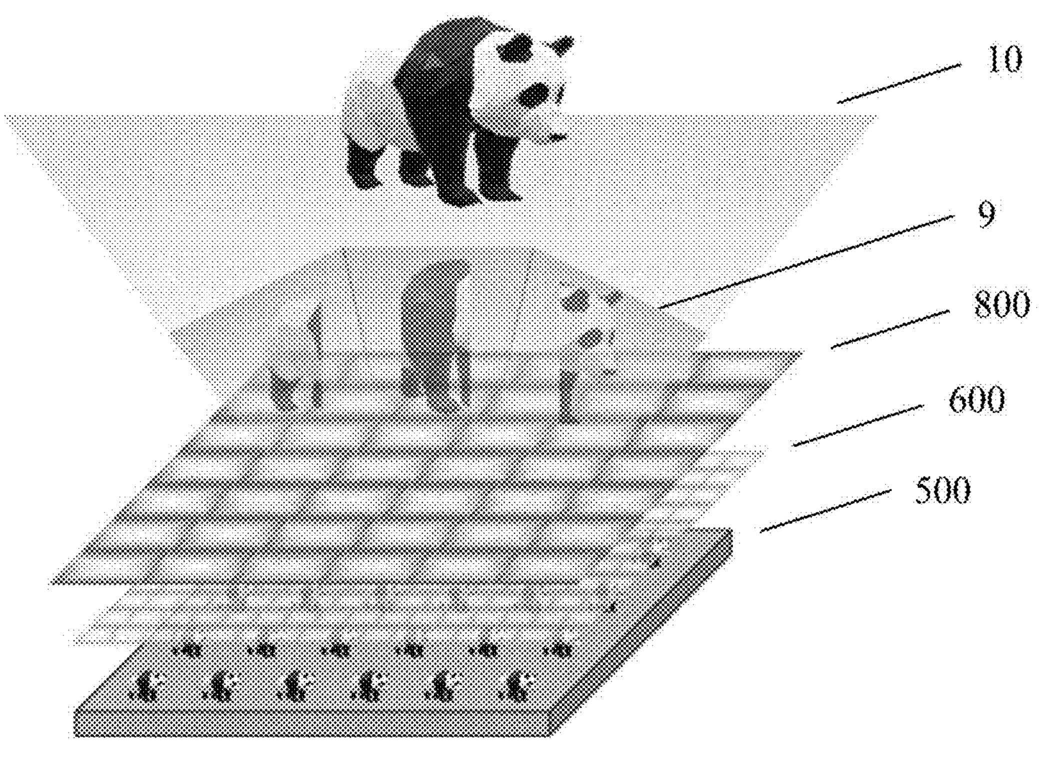
FIG. 2 is a structural schematic diagram of a large-viewing-angle integral imaging 3D display device based on secondary light field modulation.
Figure 3:
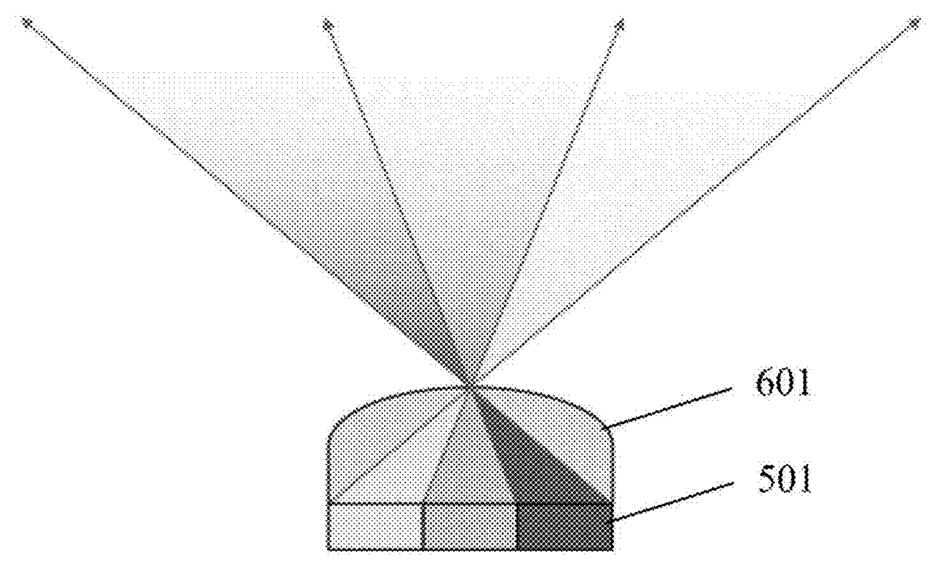
FIG. 3 is a schematic diagram of modulating sub-pixel light through a micro-lens.
Figure 4:
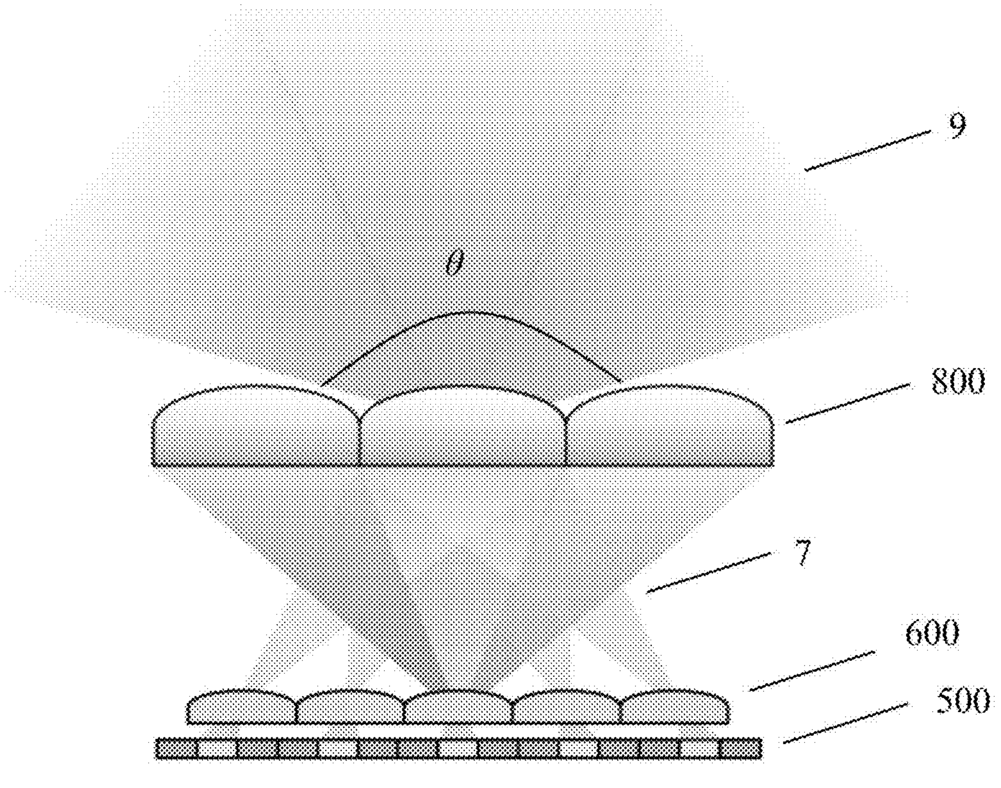
FIG. 4 is a schematic diagram of reconstructing different viewing areas through a light field guiding layer for separating light beams.

With reference to FIG. 2, the large-viewing-angle integral imaging 3D display device based on secondary light field modulation in this example includes a 2D display screen, a light field guiding layer and a light field reconstruction layer. The 2D display screen is located at a bottom layer of the device, and the light field guiding layer and the light field reconstruction layer are located above sequentially. The 2D display screen is configured to display an interleaved coded elemental image array and provide interleaved light fields with different visual area information for an upper structure of the device. The light field guiding layer is a micro-lens array and configured to modulate light emitted from the 2D display screen and guide and separate the interleaved light field with different viewing area information in space. The light field reconstruction layer is a large lens array and configured to receive separated light beams modulated by the light field guiding layer, reconstruct the separated light beams from different directions into separated viewing areas respectively, and merge the separated viewing areas simultaneously to achieve expansion of a 3D viewing angle.

In this example, the interleaved coded elemental image array is composed of a plurality of interleaved elemental images, and each of the interleaved elemental images is composed of 49 sub-pixels with a width of 0.03 mm from a 2D display screen with a resolution of 3840×2160 and contains part of the light field information in all the separated viewing areas.

In this example, the light field guiding layer is a micro-lens array, with a back focal plane located at the 2D display screen, and is formed by arranging a plurality of micro-lenses with a focal length of 0.30 mm and a pitch of 0.22 mm, which performs first light field modulation on the light emitted from the 2D display screen. Each micro-lens modulates 7 sub-pixels in an interleaved elemental image covered by same, and the light emitted by sub-pixels at different positions in each interleaved elemental image is refracted by the micro-lens to produce separated light beams in 7 directions.

In this example, the light field reconstruction layer is located 6.30 mm above the light field guiding layer, and is formed by arranging a plurality of large lenses with a focal length of 0.50 mm and a pitch of 0.63 mm, which performs the secondary light field modulation on the light emitted from the 2D display screen. The separated light beams in the 7 directions generated by the light field guiding layer are respectively irradiated to 7 adjacent large lenses, and at the same time, each large lens is irradiated by the separated light beams refracted by 7 adjacent micro-lenses. Each large lens refracts and converges the separated light beams to form 7 adjacent separated viewing areas, and the 7 separated viewing areas can be merged into a complete viewing area by adjusting 3D content thereof. A visual angle θ of the complete viewing area is 78.4°, which can be calculated based on the formula (1):

$$\theta = 2\arctan\left(\frac{mnp_d}{2d}\right) \tag{1}$$

where $p_d$ is a sub-pixel width of the 2D display screen, and d is a distance between the light field guiding layer and the light field reconstruction layer.

Figure 5:
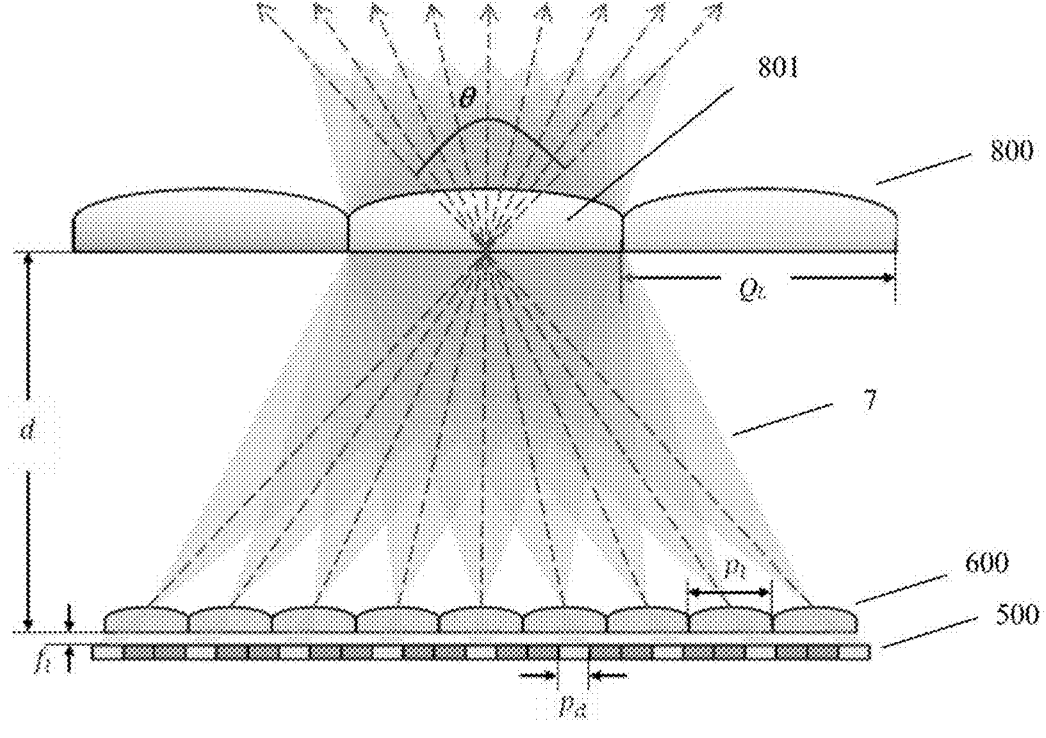
FIG. 5 is a schematic diagram of merging separated viewing areas of a device of the present disclosure.

As illustrated in FIG. 5, in order to ensure that the light field information of separated viewing areas can be accurately separated and reconstructed, parameters of the sub-pixels, the light field guiding layer and the light field reconstruction layer need to meet the following requirements:

$$\frac{d}{d+f_l} = \frac{np_d}{p_l} \tag{2}$$

$$\frac{Q_L}{d} = \frac{p_d}{f_l} \tag{3}$$

where $f_l$ and $p_l$ are a focal length and pitch of the light field guiding layer, and $Q_L$ is a pitch of the light field reconstruction layer.

The present disclosure provides a large-viewing-angle integral imaging 3D display device based on secondary light field modulation, and a method of displaying different content in a plurality of viewing areas and then splicing and recombining is used to expand a viewing angle. The 2D display screen is configured to display the interleaved coded elemental image array and provide the interleaved light field with different viewing area information. The light field guiding layer performs the first light field modulation to guide and separate the light emitted from the sub-pixels in the interleaved elemental images to form a plurality of separated light beams. The light field reconstruction layer performs the secondary light field modulation to reconstruct the separated light beams into separated viewing areas, and then displays continuous 3D information in different separated viewing areas to effectively expand the viewing angle.

What is claimed is:

1. A large-viewing-angle integral imaging 3D display device based on secondary light field modulation, wherein the device comprises a 2D display screen, a light field guiding layer and a light field reconstruction layer, the 2D display screen is located at a bottom layer of the device, and the light field guiding layer and the light field reconstruction layer are located above sequentially; the 2D display screen is configured to display an interleaved coded elemental image array and provide an interleaved light field with different viewing area information for an upper structure of the device; the light field guiding layer is a micro-lens array and configured to modulate light emitted from the 2D display screen and guide and separate the interleaved light field with different viewing area information in space; the light field reconstruction layer is a large lens array, and is formed by arranging a plurality of large lenses with the same parameters, which is configured to receive separated light beams modulated by the light field guiding layer and perform the secondary light field modulation on the light emitted from the 2D display screen; the separated light beams in the n directions generated by the light field guiding layer are respectively irradiated to n adjacent large lenses, and at the same time, each large lens is irradiated by the separated light beams refracted by $$\frac{m}{n}$$

adjacent micro-lenses; it is ensured that a parameter $$\frac{m}{n}$$

is designed to be an integer; each large lens refracts and converges the separated light beams to form n adjacent separated viewing areas, and the n separated viewing areas can be merged into a complete viewing area by adjusting 3D content of the n separated viewing areas; a visual angle θ of the complete viewing area can be calculated based on the formula $$\theta = 2\arctan\left(\frac{mnp_d}{2d}\right),$$

wherein $p_d$ is a sub-pixel width of the 2D display screen, and d is a distance between the light field guiding layer and the light field reconstruction layer; the light field guiding layer reconstructs the separated light beams from different directions into separated viewing areas respectively, and merge the separated viewing areas simultaneously to achieve expansion of a 3D viewing angle; in order to ensure that the light field information of different separated viewing areas can be accurately separated and reconstructed, parameters of the sub-pixels, the light field guiding layer and the light field reconstruction layer need to meet the requirements of the formulas $$\frac{d}{d+f_l} = \frac{np_d}{p_l} \text{ and } \frac{Q_L}{d} = \frac{p_d}{f_l},$$

wherein $f_l$ and $p_l$ are a focal length and pitch of the light field guiding layer, and $Q_L$ isa pitch of the light field reconstruction layer; and the distance d between the light field guiding layer and the light field reconstruction layer is not less than $$\frac{f_l p_l}{p_d},$$

to ensure that the separated light beams irradiating the same large lens can completely overlap.

2. The large-viewing-angle integral imaging 3D display device based on secondary light field modulation according to claim 1, wherein the interleaved coded elemental image array is composed of a plurality of interleaved elemental images, and each of the interleaved elemental images is composed of m sub-pixels of the 2D display screen and contains part of the light field information in all the separated viewing areas.

3. The large-viewing-angle integral imaging 3D display device based on secondary light field modulation according to claim 1, wherein the light field guiding layer is a micro-lens array located above the 2D display screen, and is formed by arranging a plurality of micro-lenses with the same parameters, which performs first light field modulation on the light emitted from the 2D display screen; and each micro-lens modulates n sub-pixels in an interleaved elemental image covered by same, and the light emitted by sub-pixels at different positions in each interleaved elemental image is refracted by the micro-lens to produce separated light beams in n directions.

4. The large-viewing-angle integral imaging 3D display device based on secondary light field modulation according to claim 3, wherein the 2D display screen is located at a focal plane beneath the light field guiding layer to reduce a divergence angle of the separated light beams and avoid crosstalk between adjacent light beams during the secondary light field modulation.

5. The large-viewing-angle integral imaging 3D display device based on secondary light field modulation according to claim 3, wherein the number n of sub-pixels modulated by the micro-lens should be less than 30 to mitigate an impact of edge aberration of the micro-lens on light modulation, and a pitch of the large lens array should not be too large to ensure a 3D display effect.

6. The large-viewing-angle integral imaging 3D display device based on secondary light field modulation according to claim 1, wherein the 2D display screen, the light field guiding layer and the light field reconstruction layer are center-aligned, such that a width of a single separated light beam is enough to just illuminate one large lens, thereby ensuring that each large lens does not reconstruct the separated light beams irradiating adjacent large lens.

* * * * *